April 24, 1945.　　　G. W. DUNHAM　　　2,374,590
WASHING MACHINE CONTROL
Filed Feb. 5, 1944
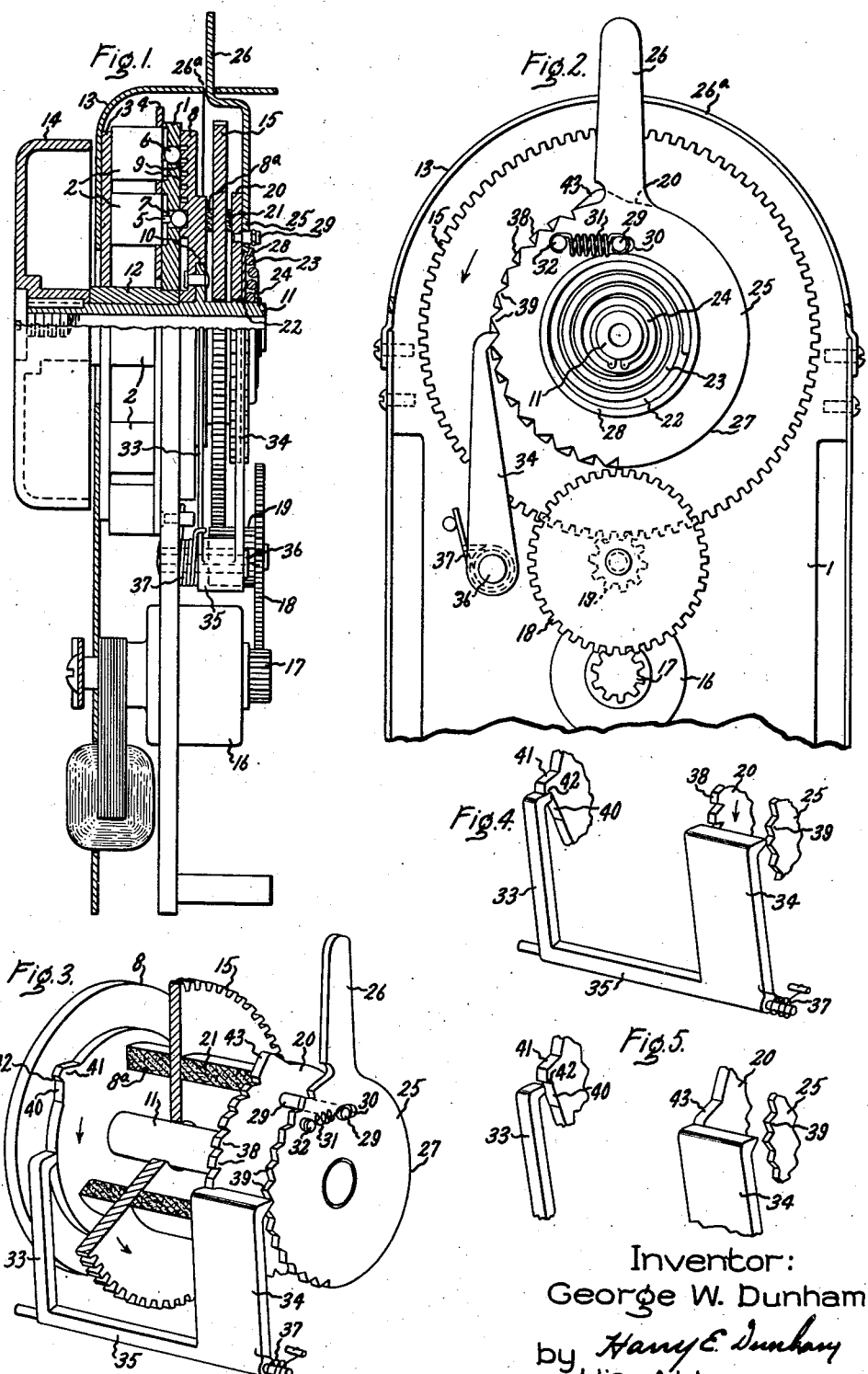
Inventor:
George W. Dunham,
by Harry E. Dunham
His Attorney.

Patented Apr. 24, 1945

2,374,590

UNITED STATES PATENT OFFICE 2,374,590

WASHING MACHINE CONTROL

George W. Dunham, Westport, Conn., assignor to General Electric Company, a corporation of New York Application February 5, 1944, Serial No. 521,276

7 Claims. (Cl. 161—1)

The present invention relates to a control for a sequence of operations which is particularly adapted for use in automatic washing machines where the operations of filling, washing, rinsing, etc., are to be carried out in timed sequence. While most of the operations require fixed intervals independent of the type of clothes being washed, it is desirable that the washing time be variable to conform with the judgment of the operator.

The object of my invention is to provide an improved control for a sequence of operations in which the duration of one of the operations in the sequence is adjustable, and for a consideration of what I believe novel and my invention attention is directed to the following description and the claims appended thereto.

In the accompanying drawing, Fig. 1 is a sectional side elevation of a control embodying my invention; Fig. 2 is a rear elevation; Fig. 3 is an exploded perspective of the drive for the control; and Figs. 4 and 5 are fragmentary views illustrating the operation.

Referring to the drawing there is shown a control having a mounting plate 1 having a plurality of switches 2 clamped against the front face of the plate by a plate 3. The switches are located by openings in a plate 4 so the switch operating plungers 5 are opposite balls 6 slidably confined in holes 7 in the mounting plate. On the opposite face of the mounting plate is a rotatable disk 8 having annular cam surfaces 9 which cooperate with the respective balls to sequentially open and close the associated switches which, for example, may be associated with a washing machine so as to cause the performance of washing operations in an order determined by the cam surfaces and at a timing determined by the speed of rotation of the cam disk 8. The details of the cam surfaces and of the connections between the switches and the operating parts of the machine are not illustrated since these features are matters of design to suit the construction and operating characteristics of the controlled machine.

The cam disk 8 is fastened to a flange 10 on a tubular shaft 11 journaled in a sleeve bearing 12 carried between the plates 1 and 3. The front end of the shaft which projects through an enclosing cover 13 carries a dial 14 indicating the position of the cam disk to inform the user of the operation being performed. By turning the dial, the operator can change to any other operation. This is made possible by the fact that the cam disk is driven through a slip friction clutch 8a on its rear face which engages a gear 15 loose on the shaft 11 and rotated at the desired speed (e. g., 1 revolution in 30 minutes) by a timing motor 16 through a gear train 17, 18, 19. The friction clutch slips while the cam disk is being adjusted by the operator. On the opposite face of the gear 15 is a disk 20 driven through a slip friction clutch 21. The disk 20 is loose on the shaft 11 and on its rear face is a thrust washer 22 on which is seated one end of a compression spring 23 having its opposite end seated on washer 24 on the shaft. The spring 23 holds the friction clutches 8a and 21 in driving engagement with the gear 15. The end thrust of the shaft is taken between the dial 14 and the end of the sleeve bearing 12. The disk 20 is manually rotatable by means of an adjusting lever 25 having a handle 26 projecting through a slot 26a in the top of the cover 13 and having an annular portion 27 rotatably seated on a rim 28 on the thrust washer 22. The lever 25 is connected to the disk 20 by a lost motion connection consisting of a pin 29 on the disk and a slot 30 in the annular portion of the lever. A tension spring 31 arranged between the pin 29 and a pin 32 on the lever yieldably holds one end of the slot 30 against the pin 29.

While the cam disk 8 and the disk 20 are at all times frictionally connected to the driving gear 15, an arrangement is provided so that any time only one of the disks is driven. This alternative drive is effected by means of pawls 33 and 34 integral with a hub 35 pivoted on a pin 36 on the mounting plate. The pawls are biased toward the disks 8 and 20 by a coil spring 37. The pawl 34 normally engages ratchet teeth 38 in the disk 20 and holds it against rotation by the friction clutch. The disk 20 can be rotated in either direction by means of the handle 26 within the limits defined by the slot. During clockwise movement of the handle as viewed in Fig. 3, the pawl 34 rides over the ratchet teeth. During counterclockwise movement of the handle, the initial movement takes up the lost motion between the pin 29 and slot 30 and moves teeth 39 on the annular portion 27 under the pawl 34 lifting it clear of the ratchet teeth 38. At the desired point in the control sequence, for example when the cam disk 8 is in the washing position, the inclined surface 40 on a projection 41 on the cam disk engages the pawl 33 and lifts it to a position in which the pawl 34 is clear of the ratchet teeth 38. At this point (as shown in Fig. 4) the pawl 33 engages a shoulder 42 on the projection 41 and holds the cam disk stationary. The disk 20 starts rotating upon release of the pawl 34 and continues rotation until the handle 26 reaches the end of the slot 26a. The interval required for this movement of the disk 20 depends upon the adjustment of the handle. In a practical case, the handle might be adjustable to add up to 10 minutes to the washing time. When the handle 26 reaches the end of the slot (the left end as viewed in Fig. 2), a projection 43 on the disk 20 engages the pawl 34 and lifts it to a position in which the pawl 33 is clear of the shoulder 42 as illustrated in Fig. 5. The cam disk resumes rotation at timing speed.

In the use of the control, the operator sets the dial to the starting position and adjusts the handle 26 to a position corresponding to the interval by which the washing operation is to be increased. The operations are thereafter carried out in sequence at a time determined by the cam disk 8 until the washing operation is reached. At this operation, the cam disk is stopped and the interval timing disk 20 is rotated for an interval determined by the adjustment of the handle 26. Since the cam disk is stopped in the washing position, the duration of the washing operation is increased by the added interval.

What I claim as new and desire to secure by Letters Patent of the United States is:

1. In combination, a sequential control for a series of operations, a timer drive for the control whereby the operations are carried out in timed sequence, and means effective during one of the operations for interrupting the timer drive for a predetermined interval whereby the duration of said operation is increased by said interval.

2. In combination, a sequential control for a series of operations, an interval control, alternative timer drives for the sequential and interval controls, means effective during one of the operations for shifting the drive to the interval control, and means effective at the end of said interval for shifting the drive to the sequential control whereby the duration of said operation is increased by said interval.

3. In combination, a sequential control for a series of operations, an interval control, timing means, slip drives from the timing means to the sequential and interval controls, means for holding the interval control, means effective during one of the operations for holding the sequential control and releasing the interval control, and means effective at the end of said interval for releasing the sequential control and holding the interval control whereby the duration of said operation is increased by said interval.

4. In a combination, a sequential control for a series of operations, a timer drive for said control whereby the operations are carried out in timed sequence, an interval control, means for presetting the interval control, and means rendered effective by the operation of the presetting means and by the movement of the sequential control to a predetermined position for rendering the drive for the sequential control ineffective for an interval determined by said interval control.

5. In combination, a plurality of switches for effecting operation of a mechanism, a rotatable actuator for the switches, a gear wheel, a slip clutch through which the gear wheel drives the actuator, a timer drive for the gear wheel, means for holding said actuator from rotating, and adjustable timing means for regulating the duration of time during which said holding means is effective whereby the duration of an operation may be increased by a desired amount.

6. In combination, a plurality of switches for effecting sequential operations in a mechanism, a rotatable timer disk having cam faces for actuating said switches, a driving member, a slip clutch through which the driving member rotates said disk, a timing motor connected to said driving member, means for locking said rotatable disk against rotation, and adjustable timing means driven by said timing motor for controlling said locking means whereby the duration of an operation may be increased by a desired amount.

7. In combination, a plurality of switches for effecting sequential operations in a mechanism, a rotatable timer disk having cam faces for actuating said switches, a driving gear, a slip clutch connecting the driving gear to said disk, a pawl for locking said disk against rotation, a second rotatable timer disk, a slip clutch through which said driving member rotates said second timer disk, a pawl for locking said second timer disk in a set position, and means carried by the first-named disk for releasing the locking pawl for the second-named disk and means carried by the second-named disk for releasing the pawl for the first-named disk.

GEORGE W. DUNHAM.